(12) United States Patent
Littrell et al.

(10) Patent No.: US 7,721,407 B2
(45) Date of Patent: May 25, 2010

(54) METHOD OF MANUFACTURING A SECURITY DEVICE

(75) Inventors: Paul A Littrell, Fort Wayne, IN (US); Wanda K Beard, Angola, IN (US); David L Gilbert, Fort Wayne, IN (US)

(73) Assignee: Brammall, Inc., Angola, IN (US)

( * ) Notice: Subject to any disclaimer, the term of this patent is extended or adjusted under 35 U.S.C. 154(b) by 847 days.

(21) Appl. No.: 11/417,035

(22) Filed: May 4, 2006

(65) Prior Publication Data

US 2007/0258790 A1 Nov. 8, 2007

(51) Int. Cl.
B23P 11/00 (2006.01)
(52) U.S. Cl. .................. 29/509; 29/525.02; 29/525.06
(58) Field of Classification Search ............... 29/509, 29/513, 525.05, 525.06; 292/307 R, 307 B, 292/318, 319, 320, 324, 327, 313, DIG. 38; 70/50, 53
See application file for complete search history.

(56) References Cited

U.S. PATENT DOCUMENTS

| 514,425 | A | 2/1894 | Luce |
| 1,017,950 | A | 2/1912 | Brooks |
| 1,803,803 | A | 5/1931 | Kaufman |
| 2,029,024 | A | 1/1936 | Justheim |
| 2,116,338 | A | 5/1938 | Brooks |
| 2,187,661 | A * | 1/1940 | Lochrane ............ 123/90.51 |
| 2,341,469 | A | 2/1944 | Newall |
| 2,799,027 | A | 7/1957 | Hatebur |
| 4,023,225 | A | 5/1977 | Tochilkin et al. |
| 4,802,699 | A | 2/1989 | Smith |
| 4,802,700 | A | 2/1989 | Stevenson et al. |
| 4,929,006 | A | 5/1990 | Tsay |
| 4,936,612 | A | 6/1990 | Kohn |
| 5,127,687 | A | 7/1992 | Guiler |
| 5,165,740 | A | 11/1992 | Curnes et al. |
| 5,769,470 | A | 6/1998 | Toyomura |
| 5,855,054 | A | 1/1999 | Rivera et al. |
| 6,161,273 | A | 12/2000 | Rivera et al. |
| 6,293,599 | B1 | 9/2001 | Garcia |
| 6,423,935 | B1 * | 7/2002 | Hackel et al. .......... 219/121.85 |

(Continued)

FOREIGN PATENT DOCUMENTS

DE 19928703 12/2000

(Continued)

Primary Examiner—Jermie E Cozart
(74) Attorney, Agent, or Firm—Van Dyke, Gardner, Linn & Burkhart LLP

(57) ABSTRACT

A security device is described including a bolt and a securement washer through which the bolt is be disposed. The securement washer includes a hole, at least one circumferential groove within the hole, and a C-shaped ring disposed within the circumferential groove. The security device also includes a first end cap with a bolt head receiving well, a first end cap hole through which the shaft of the bolt is disposed, and a first end cap circumferential wall extending above the head of the bolt. The first end cap circumferential wall permits the first end cap to be closed around the head of the bolt. The security device also includes a second end cap with a securement washer receiving well and a second end cap circumferential wall extending above the securement washer. The second end cap circumferential wall permitting the second end cap to be closed around the securement washer.

25 Claims, 18 Drawing Sheets

U.S. PATENT DOCUMENTS

| | | |
|---|---|---|
| 6,550,829 B1 | 4/2003 | Dobson |
| 6,869,113 B2 | 3/2005 | Burt |
| D514,425 S | 2/2006 | Hamilton et al. |
| 2006/0266087 A1 | 11/2006 | Hamilton et al. |
| 2007/0007776 A1 | 1/2007 | Beard et al. |

FOREIGN PATENT DOCUMENTS

| | | |
|---|---|---|
| EP | 1063373 | 12/2000 |
| FR | 2630772 | 4/1988 |
| GB | 2175254 | 11/1986 |
| JP | 01099740 A | 4/1989 |
| JP | 08309472 A | 11/1996 |

\* cited by examiner

METHOD OF MANUFACTURING A SECURITY DEVICE

CROSS-REFERENCE TO RELATED APPLICATIONS

This is a first-filed application. As such, this application does not rely on any other application for priority.

BACKGROUND OF THE INVENTION

1. Field of the Invention

This application relates to security devices and methods of manufacture thereof. In particular, this application relates to security seals for shipping containers that incorporate a bolt.

2. Description of the Related Art

Security seals are used widely in the shipping industry to provide a tamper-resistant closures for many different types of shipping containers and shipping receptacles. In one common example, one or more security seals are placed on the exterior of a shipping container (e.g., a container that is placed on a cargo ship for international shipping) after the contents of the container are verified.

There are many reasons for which a shipper might want (or be required) to seal a container after the contents of the container are placed therein. For example, for international shipping, customs requires that the freight container be sealed. In addition, in domestic shipping situations, there is often a need to seal a freight container for purposes of preventing tampering with the contents of the freight container.

Regardless of the reasons for which a security seal is employed, the security seal is expected to perform its intended function—namely to discourage opening of the container and to indicate if the container has been opened during transit for any reason. If the seal is broken, the recipient of the container will be able to quickly and easily determine that the container has been opened so that the recipient may reject the shipment, take appropriate corrective action, etc.

Of the many types of container seals that are known, one variety is referred to as a "bolt seal" because the security seal incorporates a bolt into its construction. Reference will now be made to FIGS. 20-23, which assist in providing an overview of the related art.

It is noted that the following discussion is intended to provide an overview of the related art to facilitate an understanding of various aspects of the invention described herein. Before delving into the discussion of the related art, a brief overview of some of the specific deficiencies in the art is provided.

Bolt seals in the art typically are made from metal. As such, the seals do not include any indicia of color that may be used by a shipper to identify characteristics either of the shipping container or the contents of that container. For example, a shipper may wish to utilize seals with indicia of color to identify containers that are designated for international destinations. In another example, with respect to the contents of the container, the shipper may wish to employ different colored seals to indicate if the contents are fragile or perishable.

There are no standards in the shipping industry with respect to the use of color for particular shipments or containers. Accordingly, shippers may establish their own color schemes for the seals that they employ. In this regard, the colors that shippers select are individual (or specific) for that shipper.

As may be immediately apparent, when metal bolt seals are used to seal a container, without further modification, the seal has no color other than the color of the metal from which the seal is constructed. As would be appreciated by those skilled in the art, shippers typically do not apply color to the seals that they purchase because the application of color (e.g., by painting the seal) requires labor, which takes time and, therefore, adds cost.

Accordingly, in response to an increased interest from shippers, a need has arisen for bolt seals that incorporate color as an identifying feature. One difficulty with the manufacture of seals incorporating color lies in the fact that bolt seals traditionally are made from metal. Once a manufacturer chooses to supply bolt seals with indicia of color, the cost of the bolt seals increases for several reasons. Accordingly, at least from the standpoint of the manufacturer, a need has now arisen for bolt seals that incorporate indicia of color but that are not prohibitively expensive to manufacture.

Before explaining in greater detail some reasons why, at least with respect to the prior art, manufacturing and supplying bolt seals with indicia of color is more expensive, a general overview of related bolt seals is provided below.

FIG. 20 illustrates features of a bolt seal that is described in U.S. Pat. No. 4,802,699.

The bolt seal 10 includes a bolt 12 and a nut 14. The bolt 12 includes a head 16 connected to an elongated shaft 18. The elongated shaft 18 includes a tapered end 20, a plurality of parallel rings 22 and a plurality of grooves or notches 24. The nut 14 includes an end cap 26 and an interior security member 28, both of which cooperate with a first C-shaped ring 30 and a second C-shaped ring 32.

When the security seal 10 is installed on a freight container, the shaft 18 of the bolt 12 is inserted typically through structural members on the doors of shipping container. The nut 14 is then slid onto the shaft 18 until the nut 14 engages the parallel rings 22 on the shaft 18. The first and second rings 30, 32 are smaller in diameter than the shaft 18. Accordingly, when the C-shaped rings 30, 32 are introduced to the tapered end 20 of the shaft 18, the C-shaped rings 30, 32 expand to slide easily along the shaft 18. Once the C-shaped rings 30, 32 reach one of the grooves 24, however, the C-shaped rings 30, 32 return to their unexpanded shapes and, thereby, prevent the nut 14 from sliding in the opposite direction. A plurality of grooves 24 are provided to accommodate various sizes of shipping containers, as would be appreciated by those skilled in the art.

FIG. 21 illustrates a variation on the security seal 10 shown in FIG. 20. In this example, the security seal 34 also includes a bolt 36 and a nut 38. The bolt 36 includes a head 38 and a shaft 40. The end 42 of the shaft 40 opposite the head 38 has a tapered surface 42. A groove 44 is disposed in the shaft 40 near the tapered end 42 of the shaft 40. The nut 46 in this example has a cylindrical body with a closed end 48, defining a central bore 50. The central bore 50 defines a contoured bottom end 52. The central bore 50 defines a groove 54 in which a C-shaped ring 56 is disposed.

When the tapered end 42 of the bolt 36 is inserted into the central bore 50, the C-shaped ring 56 is captured by the grooves 44, 54 so that the nut 46 cannot be removed easily from the bolt 36. As also indicated, the nut 46 has a cylindrical outer surface 58 and a flat surface 60 on its bottom end.

In both of these prior art examples, the bolts 12, 46 and the nuts 14, 46 are made from metal and do not include color identifiers.

In response to shipper interest in bolt seals that are provided with indicia of color, manufacturers have employed approaches like the one illustrated in FIGS. 22-23. The bolt seal is illustrated in FIGS. 22-23 may be found in U.S. Pat. No. Des. 514,425.

The bolt seal 68 includes a bolt 70, the cylindrical shaft of which is visible. A first end cap 72 is disposed over the nut (not shown) that engages one end of the bolt 70. The nut has the same construction as the nut 46 illustrated in FIG. 21. The first end cap 72 presents a broad surface 76 into which label information may be inscribed. The second end cap 74 is molded around the head of the bolt and presents a second surface 78 into which label information may be inscribed.

In the example illustrated in FIGS. 22 and 23, the first end cap 72 and the second end cap 74 are injection molded over the head of the bolt and over the body of the nut. While injection molding is entirely adequate for providing indicia of color, injection molding increases the cost of the bolt seal 68, which is disadvantageous in the marketplace.

In addition, because the first and second end caps 72, 74 are injection molded around the bolt 70, the end caps 72, 74 are permanently attached to the bolt and the nut. Accordingly, for the manufacturer that needs to have a variety of colors on hand for immediate shipment to a shipper, there is an increased cost associated with warehousing the myriad of colors in which the bolt seals 68 are manufactured.

In view of the foregoing, there are a number of issues raised by the prior art for which a solution is sought.

SUMMARY OF THE INVENTION

It is, therefore, an aspect of the present invention to resolve one or more of the issues noted above with respect to prior art security seals.

It is an aspect of the present invention to provide a security device that includes a bolt with a head and a shaft, wherein the shaft defines at least one circumferential groove therein. The security device also includes a securement device, defining a hole with a diameter permitting the shaft of the bolt to be disposed therein, and at least one circumferential groove within the hole. A C-shaped ring is disposed within the circumferential groove. The security device also includes one of either (1) a first end cap defining a bolt head receiving well and a first end cap circumferential wall closeable around the head of the bolt after the bolt head is received in the bolt head receiving well, or (2) a second end cap defining a securement device receiving well and a second end cap circumferential wall closeable around the securement device after the securement device is received in the securement device receiving well.

It is another aspect of the invention where the security device is a cylindrical body with a closed bottom end.

In a further aspect of the invention, the securement device has a body where the hole passes completely therethrough.

It still another aspect of the invention, the first end cap circumferential wall is closed around the bolt head via orbital peening.

In addition, an aspect of the invention provides that the second end cap circumferential wall is closed around the securement device via orbital peening.

In another aspect of the invention, the first-end cap and/or the second end cap are plastic.

One aspect of the present invention provides for a security device that combines a number of features including a bolt with a head and a shaft. The shaft defines at least one circumferential groove therein. A securement washer is included that defines a securement washer hole with a diameter permitting the shaft of the bolt to be disposed therethrough and at least one circumferential groove within the hole. A C-shaped ring is disposed within the circumferential groove within the securement washer. A first end cap is included that defines a bolt head receiving well, a first end cap hole through which the shaft of the bolt is disposed, and a first end cap circumferential wall extending above the head of the bolt once inserted into the bolt head receiving well. The first end cap circumferential wall permits the first end cap to be closed around the head of the bolt. A second end cap is also included that defines a securement washer receiving well and a second end cap circumferential wall extending above the securement washer once inserted into the securement washer receiving well. The second end cap circumferential wall permitting the second end cap to be closed around the securement washer.

Another aspect of the invention provides a security device where the securement washer comprises a tapered end and the second end cap receiving well defines a tapered surface complimentary to the tapered end of the securement washer, thereby orienting the securement washer within the securement washer receiving well.

Still another aspect of the invention provides that the first end cap include a label platform defining a label surface for label information.

One further aspect of the invention provides that the second end cap include a label platform defining a label surface for label information.

Yet another aspect of the invention provides that the first end cap be made of plastic.

A further aspect of the invention provides that the first end cap circumferential wall be folded over the head of the bolt, thereby closing the first end cap around the head of the bolt.

Still another aspect of the invention provides that the first end cap circumferential wall be folded over the head of the bolt by an orbital peening process.

An additional aspect of the invention provides that the second end cap be made of plastic.

One additional aspect of the invention provides that the second end cap circumferential wall be folded over the securement washer, thereby closing the second end cap around the securement washer.

One additional aspect of the invention provides for the second end cap circumferential wall to be folded over the securement washer by an orbital peening process.

It is another aspect of the invention to provide a security device with a bolt with a head and a shaft, wherein the shaft defines at least one circumferential groove therein, a securement nut, defining a hole with a diameter permitting the shaft of the bolt to be disposed therein, and at least one circumferential groove within the hole, the securement nut being closed at one end, and a C-shaped ring disposed within the circumferential groove. The housing defines a securement nut receiving well and a housing circumferential wall closeable around the securement nut after the securement nut is received in the securement nut receiving well.

Another aspect of the invention provides that the housing circumferential wall is closed around the securement nut via orbital peening.

A further aspect of the invention provides that the housing is plastic.

In yet another aspect, the invention provides for the housing to include a label platform defining a label surface for label information.

An additional aspect of the invention provides for a method of manufacturing a security device that includes providing a first end cap with a bolt head receiving well, inserting a bolt with a head into the bolt head receiving well until the head of the bolt is seated in the bolt receiving well, and closing the first end cap around the head of the bolt by folding a circumferential wall of the first end cap around the head of the bolt via an orbital peening process.

As another aspect of the invention, the method includes providing a first end cap label platform on the first end cap, and applying label information to the first end cap label platform. The label information may be applied to the first end cap label platform by an inscribing process. Alternatively, the inscribing process may be a laser inscribing process.

One further aspect of the invention provides for a method of manufacturing a security device that includes providing a second end cap with a securement device receiving well, inserting a securement device into the securement device receiving well until securement device is seated in the securement device receiving well, and closing the second end cap around the securement device by folding a circumferential wall of the second end cap around the securement device via an orbital peening process.

Another aspect of the invention provides that the method include providing a second end cap label platform on the second end cap, and applying label information to the second end cap label platform. The label information may be applied to the second end cap label platform by an inscribing process. Alternatively, the inscribing process may be by a laser inscribing process.

Another aspect of the invention provides a method of manufacturing a security device. The method includes providing a first end cap with a bolt head receiving well and a first end cap hole, inserting a bolt with a head though the first end cap hole until the head of the bolt is seated in the bolt receiving well, providing a second end cap with a securement washer receiving well, inserting a securement washer into the securement washer receiving well, closing the first end cap around the head of the bolt, thereby securing the bolt within the first end cap, and closing the second end cap around the securement washer, thereby securing the securement washer within the second end cap.

A further aspect of the invention provides that an orbital peening process closes the first end cap around the head of the bolt by folding a first end cap circumferential wall over the head of the bolt.

Another aspect of the invention provides that an orbital peening process closes the second end cap around the securement washer by folding a second end cap circumferential wall over the securement washer.

Yet another aspect of the invention defines that a tapered end is provided on the securement washer, and a tapered surface is provided in the securement washer receiving well that compliments the tapered end of the securement washer. The securement washer is inserted into the securement washer receiving well such that the tapered end of the securement washer abuts the tapered surface in the securement washer receiving well.

One further aspect of the invention provides for a first end cap label platform on the first end cap to that label information may be applied to the first end cap label platform.

Still another aspect of the invention provides that label information is applied to the first end cap label platform by an inscribing process.

Another aspect of the invention provides that the inscribing process is a laser inscribing process.

A further aspect of the invention provides a second end cap label platform on the second end cap so that label information may be applied to the second end cap label platform.

Yet another aspect of the invention provides that the label information is applied to the second end cap label platform by an inscribing process.

An additional aspect of the invention provides that the inscribing process is a laser inscribing process.

Still further aspects of the invention will become apparent from the description of the embodiments of the invention that follows.

DESCRIPTION OF THE DRAWINGS

The present invention will be described with reference to drawings appended hereto, in which.

DESCRIPTION OF EMBODIMENTS OF THE INVENTION

Various embodiments of the present invention will be described in connection with the figures appended hereto. The discussion of specific embodiments, however, should not be understood to convey that the invention is limited solely to those embodiments. Moreover, any reference to one embodiment or an aspect of one embodiment as "preferred" should not be understood to limit the scope of the invention in any way. To the contrary, as will be appreciated by those skilled in the art, the invention encompasses all equivalents of the structures, materials, and methodologies discussed, as would be appreciated by those skilled in the art.

Figure 1:
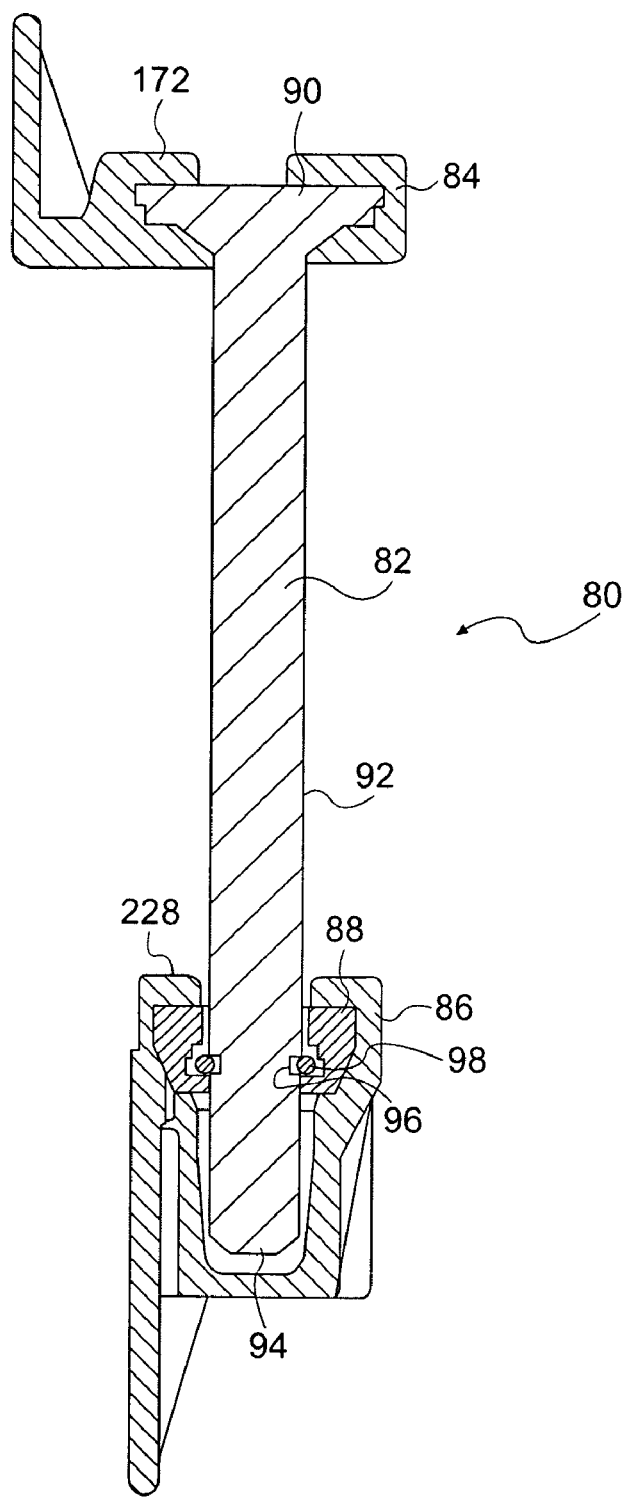
FIG. 1 is a side view illustration of one embodiment of a bolt seal of the present invention.

FIG. 1 illustrates one contemplated embodiment of a bolt seal 80 of the present invention. The bolt seal 80 includes several components: a bolt 82, a first end cap 84, a second end cap 86, and a securement washer 88. Each of these components will be described in greater detail below.

As depicted in FIG. 1, the bolt 82 has a head end 90 to which an elongated shaft 92 is secured. The elongated shaft 92 extends to a tapered end 94. Near the tapered end 94, the shaft includes a circumferential groove 96.

The bolt 82 preferably is a unitary structure made from a metal material such as cold rolled steel. Cold rolled steel is preferred at least because it is strong enough to maintain a secure seal on the opening to the shipping container and is a cost-effective material for construction of the bolt 82. Other materials may be employed including, but not limited to, stainless steel, iron, aluminum, magnesium, titanium, copper, and alloys thereof. In addition, it is contemplated that plastic or composite materials may be used to construct the bolt 82. As would be appreciated by those skilled in the art, the different materials that may be used to construct the bolt 82 are numerous. Accordingly, only a few representative examples are provided.

The shaft 92 of the bolt 82 preferably follows a straight line from end to end. However, as would be appreciated by those skilled in the art, some bolt seals include a slight bend in their shafts to accommodate different designs of shipping containers. While the bolt seal 80 of the present invention is described in connection with a bolt 82 having a straight shaft 92, the invention is intended to encompass any bolt seal design, regardless of the shape or size of the shaft 92.

The circumferential groove 96 extends around the shaft 92 near the tapered end 94 of the bolt 82. The groove 96 may have any shape or dimension sufficient to capture a C-shaped ring 98 disposed with the securement washer 88. In the preferred embodiment, the C-shaped washer 88 is made from steel. Of course, any other material may be employed including iron, aluminum, copper, titanium, nickel, or alloys containing these metals. Plastic and composite materials also may be employed as would be appreciated by those skilled in the art. As also would be appreciated by those skilled in the art, a C-shaped need not be employed in the securement washer 88. Alternative constructions for the securement washer 88 may be employed without departing from the scope of the invention.

Figure 2:
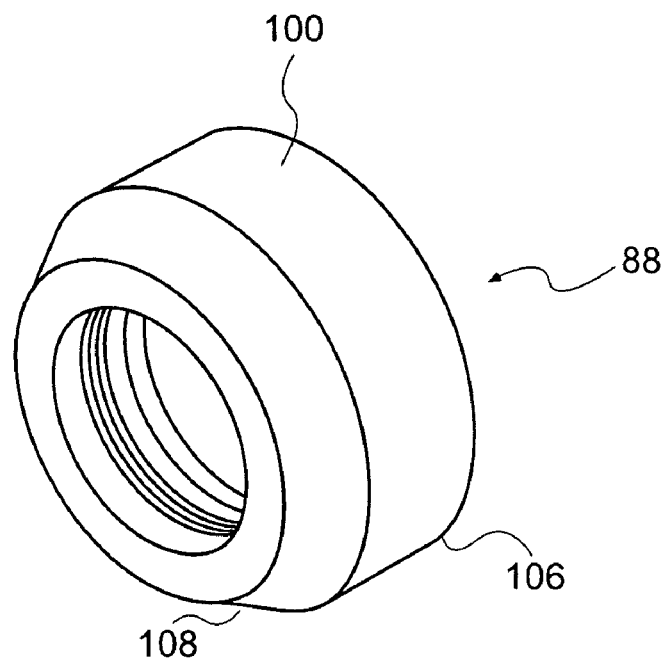
FIG. 2 is a perspective illustration of a securement washer forming a part of the bolt seal of the present invention.

FIG. 2 provides a perspective illustration of the securement washer 88. In the preferred embodiment, the securement washer 88 is a unitary construction. Of course, the securement washer could be constructed from two of more pieces that are connected together, as would be appreciated by those skilled in the art.

Figure 3:
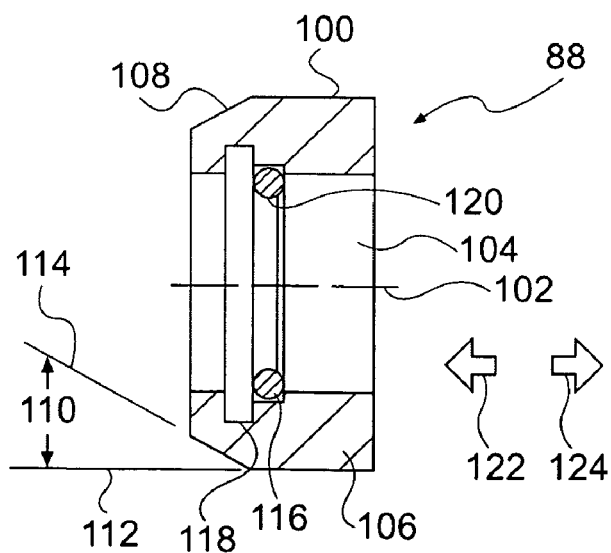
FIG. 3 is a cross-sectional illustration of the securement washer depicted in FIG. 2.

FIG. 3 is a cross-sectional illustration of the securement washer 88 of the present invention. The securement washer 88 has a body 100 that is cylindrically-shaped about a central axis 102. The body 100 of the securement washer 88 defines a hole 104 through which the shaft 92 of the bolt 82 may pass. The body 100 has a cylindrical end 106 and a tapered end 108. It is noted that the tapered end 108, while preferred, is not required to practice the invention. Accordingly, the tapered end 108 may be excluded from the securement washer without departing from the scope of the invention.

If included, the tapered end 108 defines an angle 110 between a reference line 112 and an angle line 114. The angle 110 preferably is between about 25° and 35° (degrees). More preferably, the angle 110 is between about 28° and 32°. Most preferably, the angle 110 is about 30°. Among other advantages, the tapered end 108 assists in orienting the securement washer 88 within the within the second end cap 86, as will be described in greater detail below. Also, as with the manufacture of many devices, less material used for the construction of the securement washer helps to reduce the cost of the bolt seal 80.

The body 100 defines two grooves 116, 118 therein. The first groove 116 preferable has a smaller diameter than that of the second groove 118. A C-shaped ring 120 is inserted into the grooves 116, 118 to interlock with the groove 96 when the shaft 92 of the bolt 82 has been inserted therethrough. As would be appreciated by those skilled in the art, more than one ring may be employed to interlock with the groove 96 without departing from the scope of the present invention. In addition, while the C-shaped ring 120 is illustrated with a circular cross-section, the C-shaped ring may have a square, rectangular, elliptical, oval, or other cross-section without departing from the scope of the invention.

To secure the securement washer 88 to the bolt 82, the tapered end 94 of the bolt 82 is inserted into the hole 104. Due to the taper, the tapered end 94 of the bolt 82 expands the C-shaped ring 120 until the bolt 82 has been inserted to the location containing the circumferential groove 96. At this point, the C-shaped ring 120 contracts to sit partially within the groove 96 and partially within the grooves 116, 118. Once seated within the groove 96, the securement washer 88 cannot be removed from the bolt 82 without applying a large amount of force.

For purposes of reference, the direction of insertion of the tapered end 94 of the bolt 82 into the hole 104 of the securement washer 88 is indicated by the arrow 122 in FIG. 3. The removal direction is indicated by the arrow 124. The first groove 116 facilitates insertion of the bolt 82 into the securement washer 88. Since the first groove 116 is larger in diameter than the second groove 118, the C-shaped ring 120 will be pushed into the first groove 116 during the time that the bolt 82 is being inserted into the securement washer 88. Once the C-shaped ring 120 is captured by the groove 96, the C-shaped ring 120 will seat more fully in the second groove 118, which prevents the securement washer 88 from being easily removed from the bolt 82, as would be appreciated by those skilled in the art.

It is noted that the orientation of the securement washer 88 may be reversed, as would be appreciated by those skilled in the art. If reversed, the arrow 124 would indicate the insertion direction and the arrow 122 would indicate the removal direction. The invention is intended to encompass either orientation.

Figure 4:
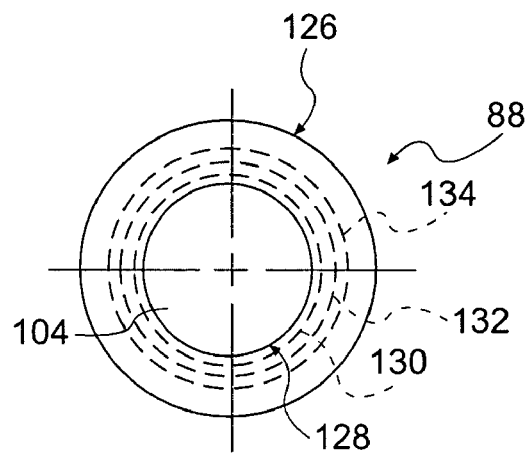
FIG. 4 is a top plan view of the securement washer shown in FIG. 2.
Figure 5:
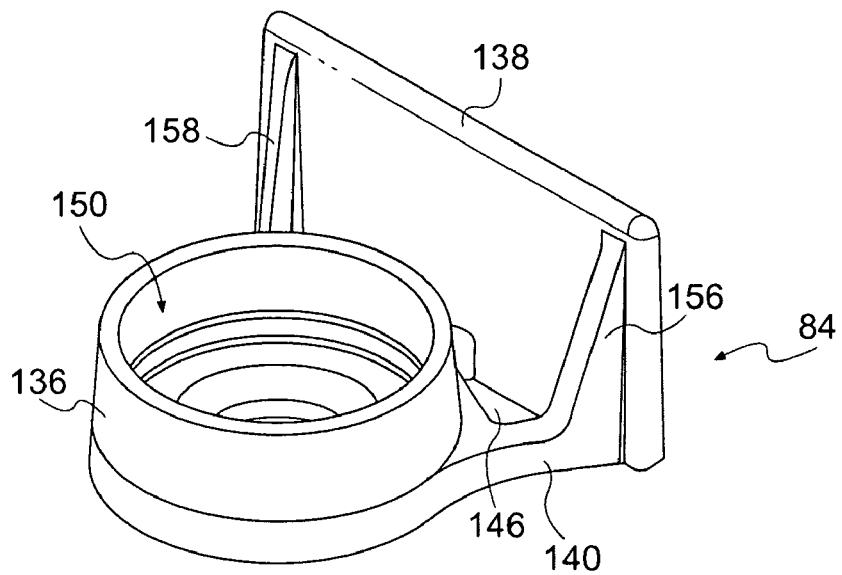
FIG. 5 is a perspective illustration of a first end cap forming a part of the bolt seal of the present invention.

FIG. 4 provides a bottom plan view of the securement washer 88. The outer diameter 126 and inner diameter 128 of the securement washer 88 are plainly visible in this view. Also visible is the diameter 130 of the first groove 116, the diameter 132 of the second groove 118, and the diameter 134 of the tapered end 108. As would be appreciated by those skilled in the art, other diameters may be employed without departing from the scope of the present invention and the relative sizes of the diameters of the structures in the securement washer 88 are provided merely for illustrative purposes of the preferred embodiment.

FIGS. 5-16 illustrate the various features of the first end cap 84 and the second end cap 86. FIGS. 5-10 illustrate various features of the first end cap 84. FIGS. 11-16 illustrate various features of the second end cap 86.

As illustrated in FIGS. 5-10, the first end cap 84 has two primary structures, a bolt head receiving housing 136 and a label platform 138.

While the label platform 138 is preferred to be incorporated into the first end cap 84, the label platform 138 is not required to practice the invention. Accordingly, while the label platform 138 is described in connection with the first end cap 84, the scope of the invention is intended to encompass constructions of the first end cap 84 that exclude the label platform 138.

Figure 6:
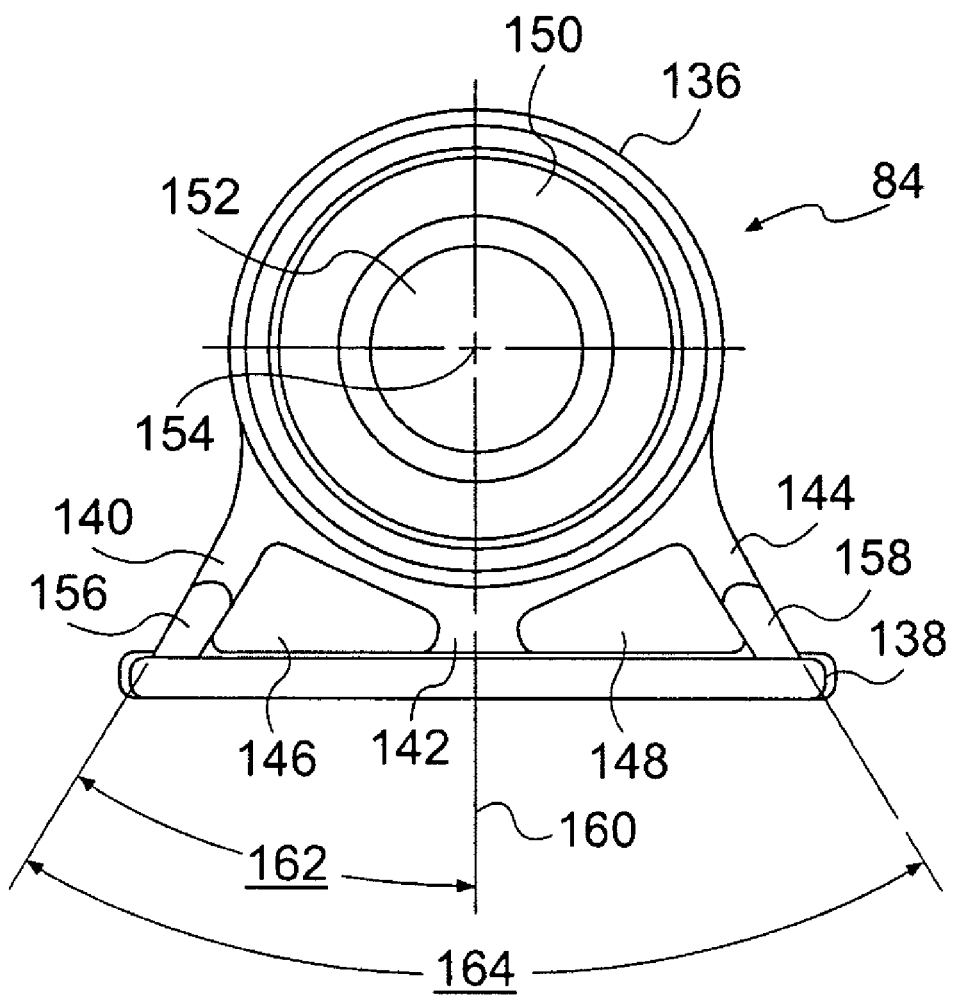
FIG. 6 is a top plan view of the first end cap illustrated in FIG. 5.

FIG. 6 is a top plan view of the preferred embodiment of the first end cap 84. The bolt head receiving housing 136 and the label platform 138 are plainly visible in this view as are the first, second, and third bridges 140, 142, 144 that connect the bolt head receiving structure 136 to the label platform 138. A first opening 146 is defined between the first bridge 140 and the second bridge 142. A second opening 148 is defined between the second bridge 142 and the third bridge 144. As would be appreciated by those skilled in the art, the first and second openings 146, 148 are not required to practice the invention. However, in keeping with the design concept that less material results in a less costly device, inclusion of the first and second openings 146, 148 is preferred.

A bolt bead receiving well 150 is defined in the bolt head receiving structure 136. The bolt head receiving well 150 defines a hole 152 therein, which is circular in shape, at least in this embodiment. Being circular, the hole 152 defines a central axis 154.

So that the label platform 138 is securely attached to the bolt head receiving structure 136, the first bridge 140 and the third bridge are provided with first and second reinforcing structures 156, 158, respectively. As would be appreciated by those skilled in the art, the first and second reinforcing structures are not required to practice the invention.

As illustrated in FIG. 6, the second bridge 142 is located along a centerline 160 extending from the central axis 154 through the label platform 138. The first bridge 140 is disposed at an angle 162 from the centerline 160. The angle 162 may be between about 25° and 35°. More preferably, the angle 162 is between about 28° and 32°. Most preferably, the angle 162 is about 30°. The third bridge 144 also is preferably disposed at the same angle as the first bridge 140 from the centerline 160. Accordingly, in the most preferred embodiment, the angle 164 between the first bridge 140 and the third bridge 144 is about 60°.

In the preferred embodiment of the invention, the first end cap 84 is made from a moldable plastic material. While plastic is preferred, other materials may be employed in the construction of the first end cap 84. For example, the first end cap may be made from metal, an alloy, or a composite material.

Figure 7:
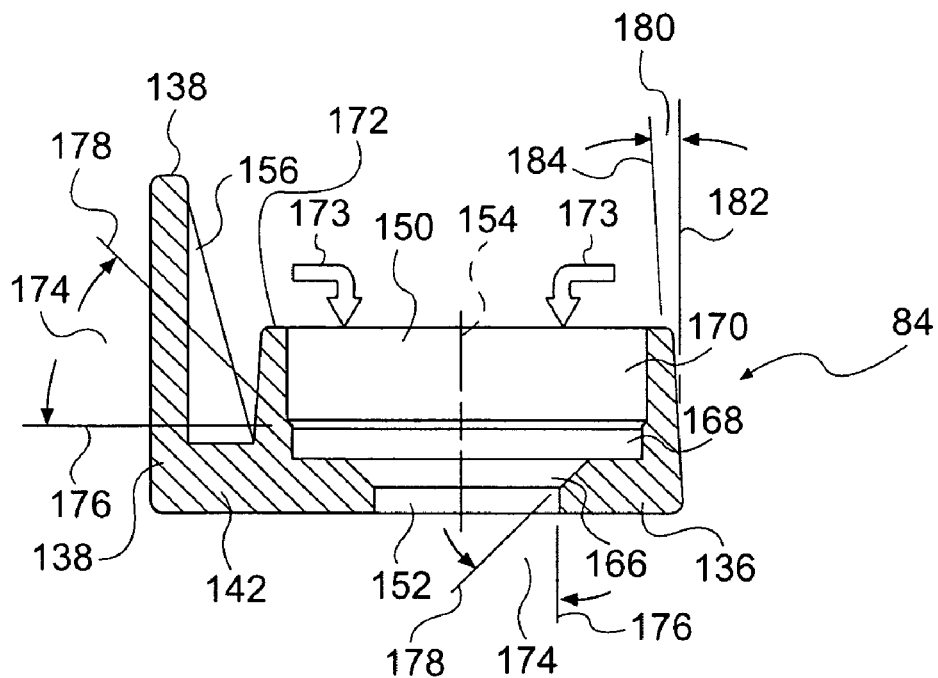
FIG. 7 is a cross-sectional side view of the end cap depicted in FIG. 5.
Figure 10:
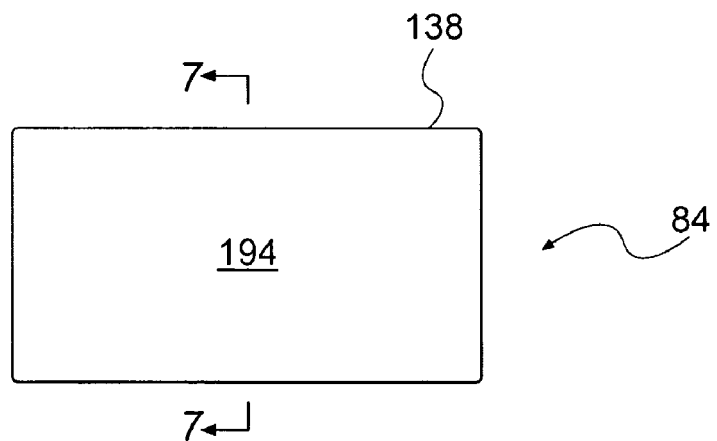
FIG. 10 is an exterior view of the label surface provided on the first end cap depicted in FIG. 5.
Figure 11:
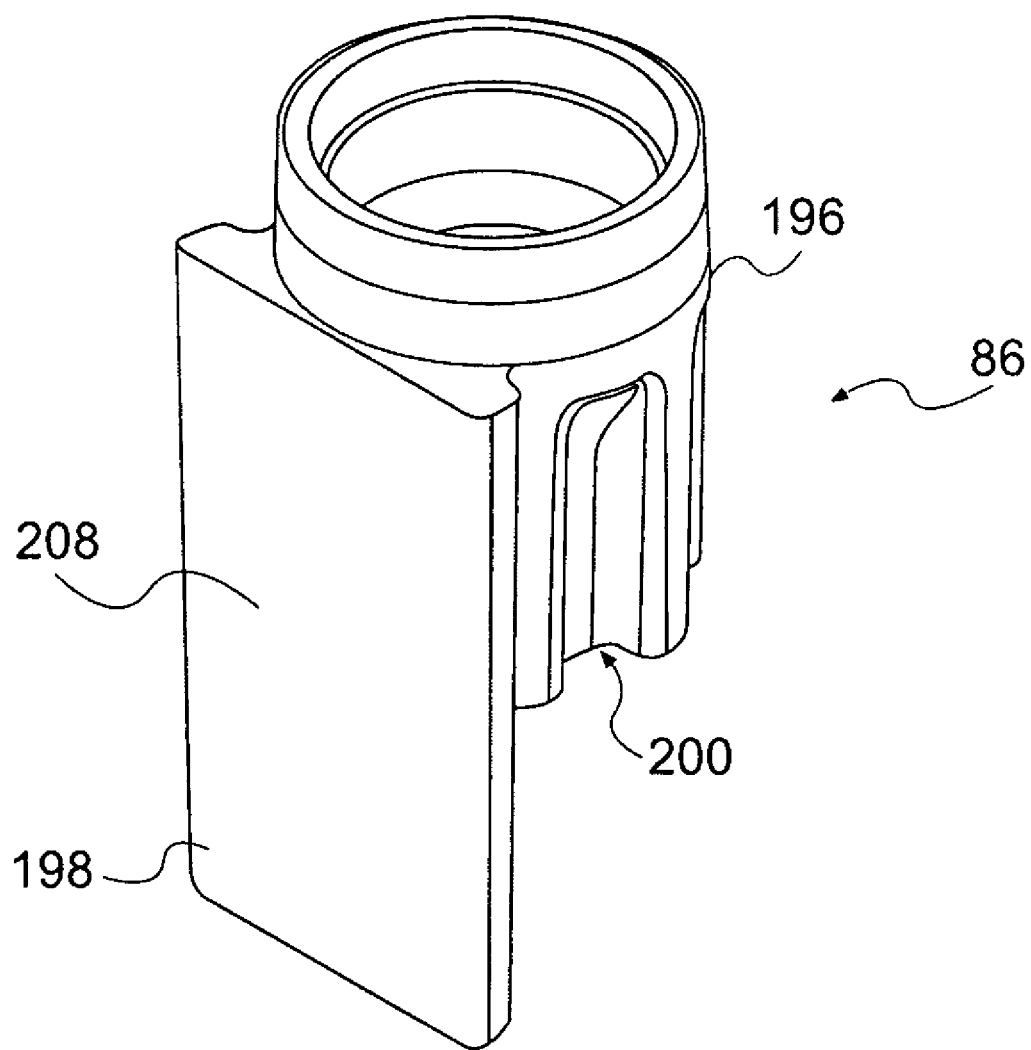
FIG. 11 is a perspective illustration of a second end cap forming a part of the bolt seal of the present invention.

FIG. 7 presents a cross-sectional side view illustration of the first end cap 84 (as indicated in FIG. 10) taken through the centerline 160. As illustrated, the bolt head receiving well 150 includes three separate areas that are in communication with the hole 152. The first area 166 is a frusto-conically-shaped area immediately adjacent to the cylindrically-shaped hole 152. The frusto-conically-shaped first area 166 is incorporated into the first end cap 84 to accommodate material that extends between the shaft 92 and the head 90 of the bolt 82. The second area 168 preferably is a cylindrically-shaped area into which the head 90 of the bolt 82 rests after the shaft 92 has been inserted through the hole 152. The third area 170 preferably is a cylindrically-shaped area with a slightly larger diameter than the second area 168.

A cylindrically-shaped wall 172 of the bolt head receiving well 150 extends upwardly from the second area 168. The cylindrically-shaped wall 172 provides material that may be folded over, in the direction of the arrows 173 to cover at least a portion of the head 90 of the bolt 82. When the wall 172 has been folded over the head 90, the bolt 82 and the first end cap 84 are secured to one another. The folding of the wall 172 over the head 90 will be described in greater detail below.

While the preferred embodiment of the first end cap provides a wall 172 that may be folded over the top of the head 90 of the bolt 82, it is contemplated that a reverse orientation also may be employed. Specifically, a wall may be provided that could be folded over the bottom of the head 90 of the bolt 82. Accordingly, this reverse orientation also is considered to be encompassed by the invention.

It is noted that the first area 166, the second area 168, and the third area 170 are merely provided to describe the preferred embodiment illustrated. As would be appreciated by those skilled in the art, the first, second, and third areas 166, 168, 170 may be merged into a single area depending upon the design selected by the manufacturer. As a result, to practice the invention, it is not required to include the first, second, and third areas 166, 168, 170 in the first end cap 84. The scope of the invention intentionally encompasses any number of areas incorporated therein.

As illustrated in FIG. 7, the wall of the frusto-conically-shaped first area 166 preferably is shaped to form an angle 174 between a reference line 176 and an angle line 178 of about 45°. The angle 174 need not be 45° to practice the invention, as would be appreciated by those skilled in the art.

In the embodiment illustrated, the wall 172 does not have a uniform thickness. In fact, it is preferred that the wall 172 not have a uniform thickness. As illustrated, the top of the wall 172 preferably is thinner than the bottom part of the wall 172. The wall 172 preferably thins at an angle 180 defined between a reference line 182 and an angle line 184. The angle 180 preferably is about 5°. The angle 180 may be larger or smaller than 5° as required or desired by the manufacturer of the first end cap 84.

Figure 8:
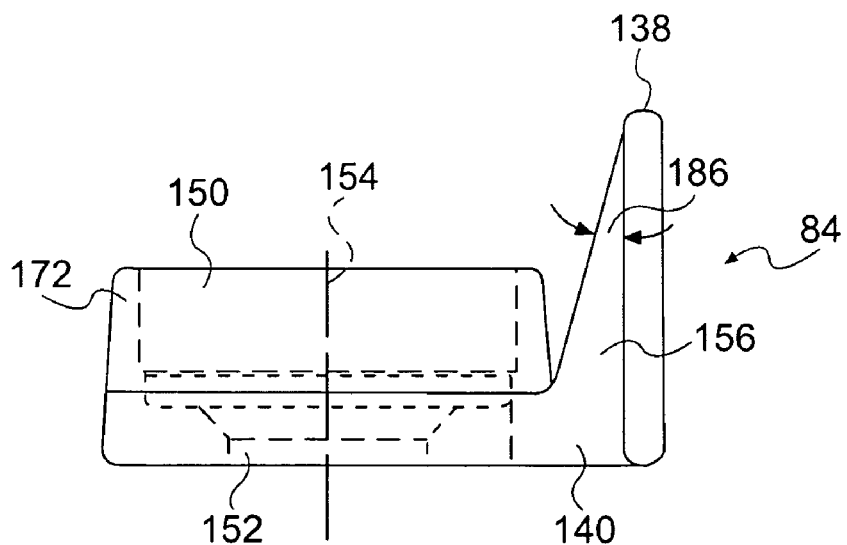
FIG. 8 is an exterior side view of the first end cap shown in FIG. 5.

FIG. 8 presents a side view of the first end cap 84. As illustrated, the reinforcing structure 156 preferably has a decreasing thickness from the bolt head receiving structure 136 to an exterior edge of the label platform 138. The decreasing thickness preferably forms an angle 186 that is about 15°. As would be appreciated by those skilled in the art, the angle 186 may be larger or smaller than 15° as required or desired by the manufacturer of the first end cap 84. The second reinforcing structure 158 preferably is constructed in the same manner.

Figure 9:
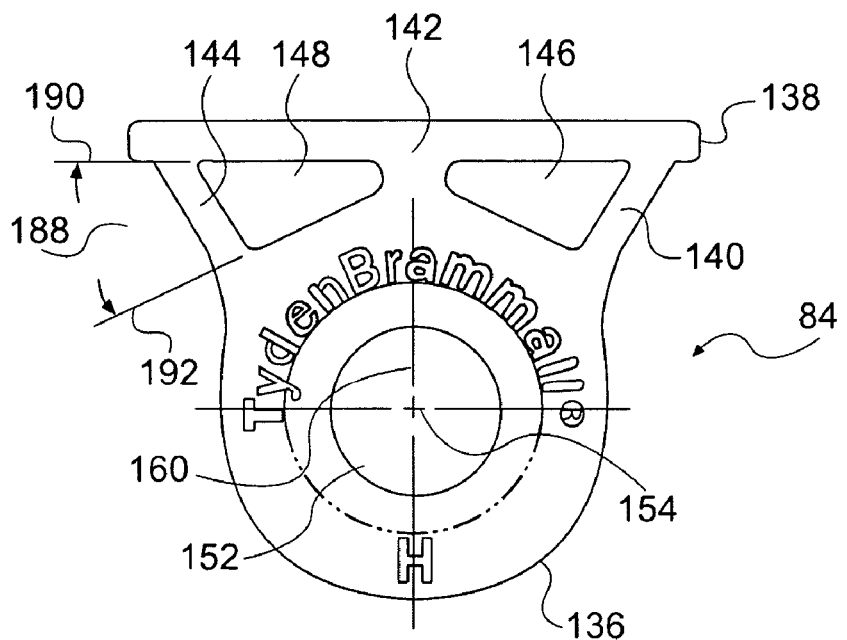
FIG. 9 is a bottom view of the first end cap illustrated in FIG. 5.

FIG. 9 provides a bottom view of the first end cap 84. As illustrated, the second opening 148 has a generally triangular shape that defines an angle 188 between a reference line 190 and an angle line 192. The angle 188 preferably is about 25°. As would be appreciated by those skilled in the art, the angle 188 may be larger or smaller than 25° as required or desired by the manufacturer of the first end cap 84. The shape of the first opening 146 preferably is a mirror image of that of the second opening 148.

FIG. 10 is a plan view of the label platform 138 on the first end cap 84. The label surface 194 is shown as a generally rectangular structure. A rectangular label surface 194, however, is not required to practice the invention. The label surface 194 may take any shape as required or desired by the manufacturer of the first end cap 84.

As would be appreciated by those skilled in the art, label information preferably is indelibly inscribed onto the label surface 194. The label information, which typically includes a unique serial number, may be inscribed using one of many techniques known in the art. For example, the label information may be inscribed using a mechanical inscribing device or a laser inscribing device. Any other method, including the use of an ink jet printer or adhesive labels, also may be employed, as desired, without departing from the scope of the invention.

FIGS. 11-16 illustrate various features of the second end cap 86 of the invention. Like the first end cap 84, the second end cap 86 includes two primary components, a securement washer receiving structure 196 and a label platform 198. As with the first end cap 84, in the second end cap 86, the securement washer receiving structure 196 is connected to the label platform 198.

As with the first end cap 84, while the label platform 198 is preferred to be incorporated into the second end cap 86, the label platform 198 is not required to practice the invention. Accordingly, while the label platform 198 is described in connection with the second end cap 86, the scope of the invention is intended to encompass constructions of the second end cap 86 that exclude the label platform 198.

Figure 12:
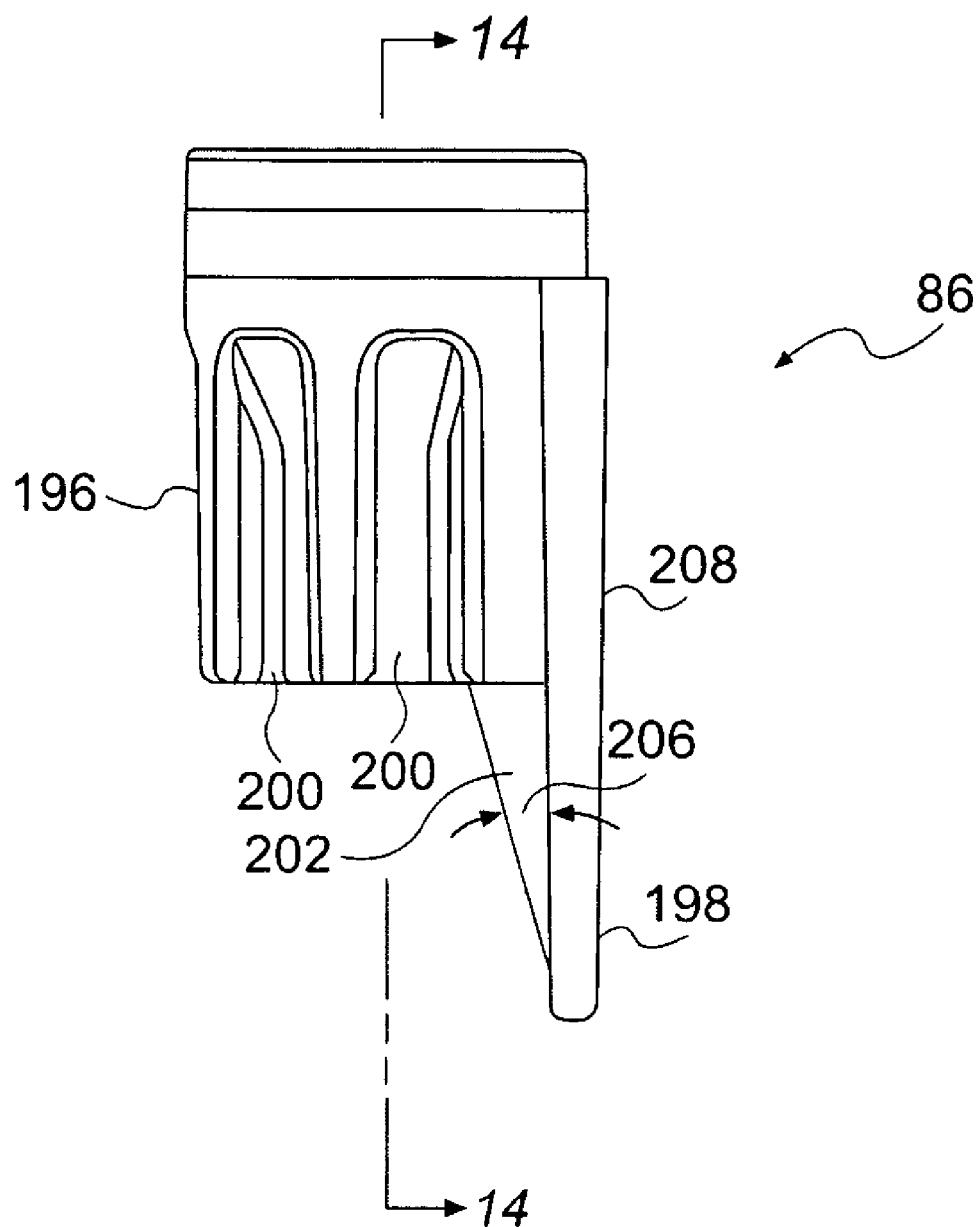
FIG. 12 is an exterior side view of the second end cap illustrated in FIG. 11.

FIG. 12 provides a side view of the second end cap 86. Since the second end cap 86 contains the securement washer 88, the second end cap 86 is a component separate from the first end cap 84 that contains the bolt 82. To facilitate insertion of the tapered end 94 of the bolt 82 into the securement washer 88, the second end cap 86 includes a plurality of recesses 200 therein, which help the user to grasp the second end cap 86. In addition, the inclusion of recesses 200 reduces the amount of material required to construct the second end cap 86 and, therefore, reduces the cost of manufacture of the second end cap 86.

Figure 14:
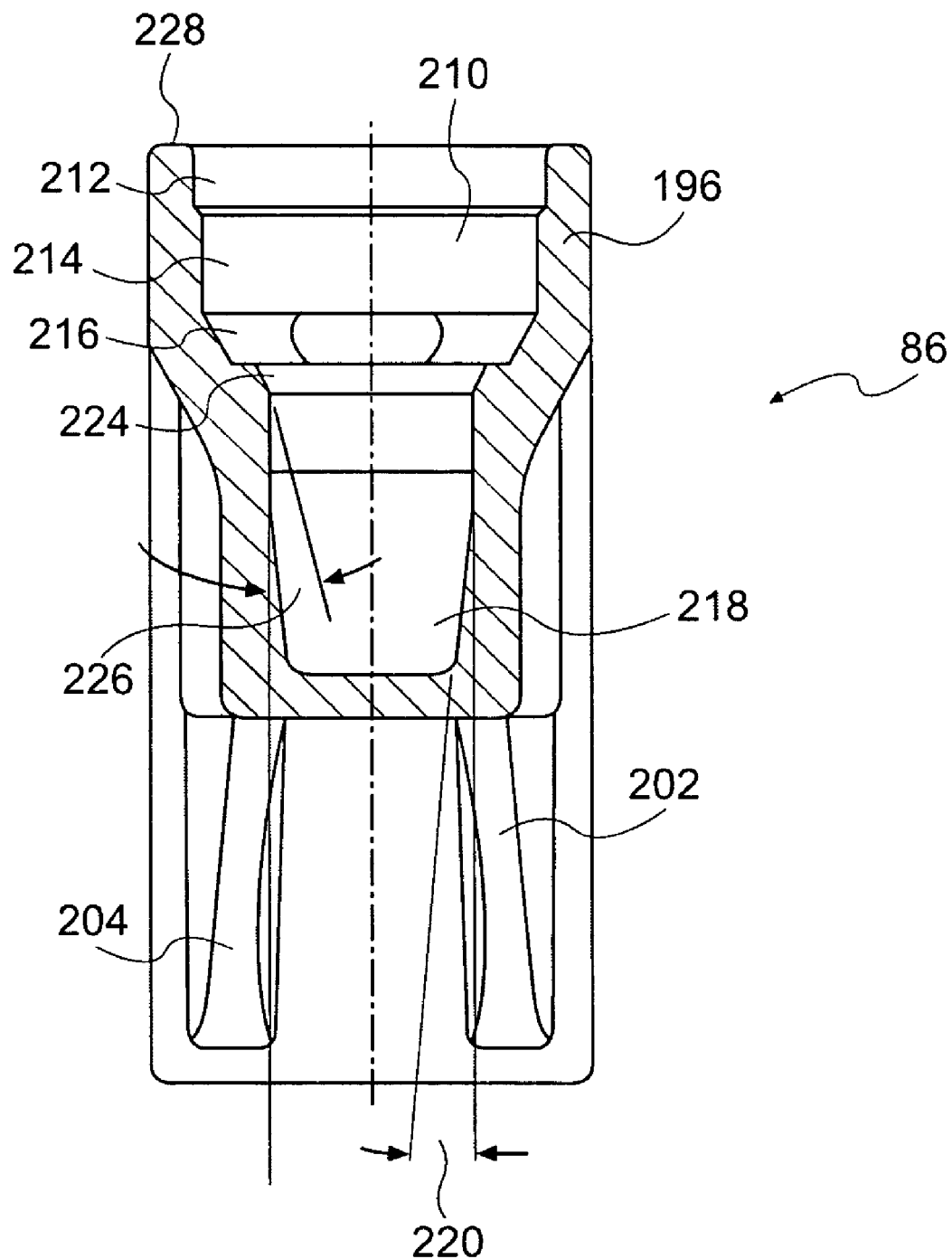
FIG. 14 is a cross-sectional side view of the second end cap depicted in FIG. 11, the cross-section being taken at a plane disposed 90° from the plane of the cross-section illustrated in FIG. 13.

As illustrated in FIG. 12, the label platform 198 is attached to the securement washer receiving structure 196 via two reinforcing structures 202, 204 (see FIG. 14). The thickness of the reinforcing structures 202, 204 increases at an angle 206 that is preferably about 15°. As would be appreciated by those skilled in the art, the angle 206 may be larger or smaller than 15° as required or desired by the manufacturer of the second end cap 86.

As the various illustrations of the second end cap make clear, the label platform 198 defines a label surface 208. The label surface 208 will be described in greater detail below.

Figure 13:
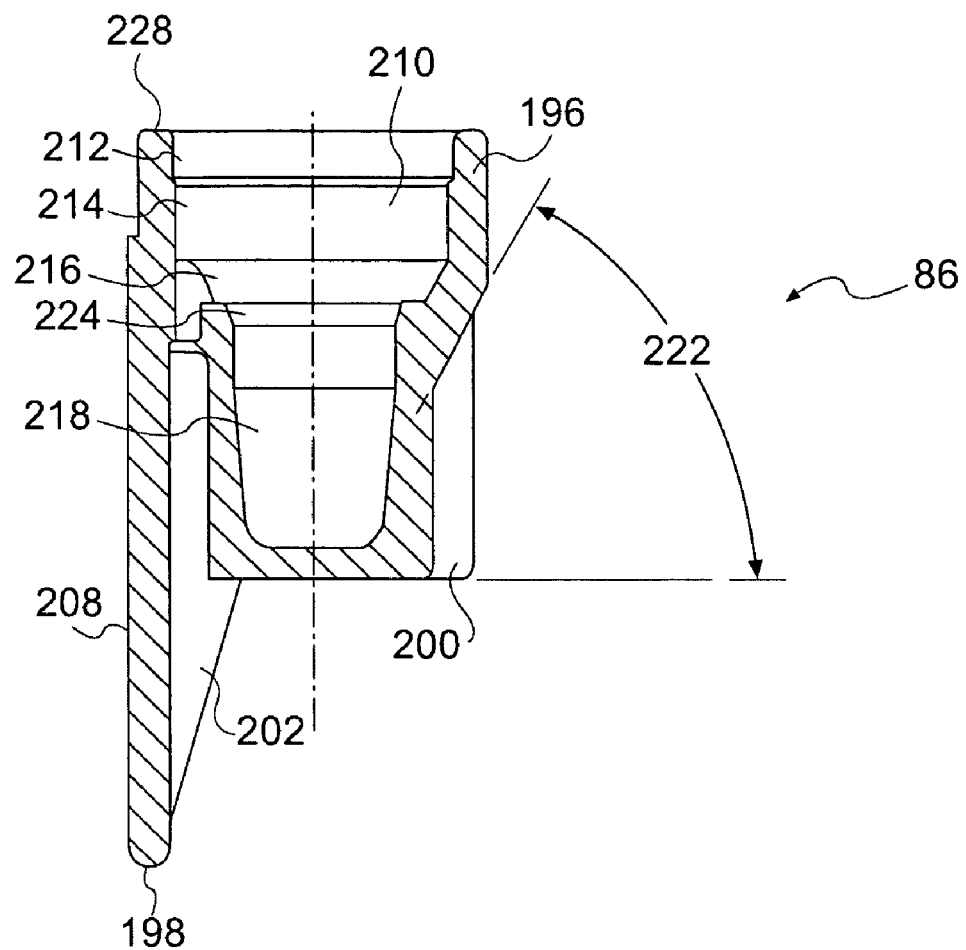
FIG. 13 is a cross-sectional side view of the second end cap shown in FIG. 11.

FIG. 13 is a cross-sectional view of the second end cap 86. The structures illustrated as the same as discussed above. This illustration makes more clear the internal structure of the second end cap 86. In particular, FIG. 13 illustrates the securement washer receiving well 210. The securement washer receiving well 210 includes at least a first area 212, a second area 214, a third area 216, and a fourth area 218.

When the securement washer 88 is placed into the securement washer receiving well 210, the securement washer 88 occupies the second area 214 and the third area 216. The third area 216 is frusto-conically shaped to accommodate the tapered end 108 of the securement washer 88. This assures that the securement washer 88 is correctly oriented within the second end cap 86, among other advantages.

As with the first end cap 84, the second end cap 86 need not incorporate the first, second, third, and fourth areas 212, 214, 216, 218. To the contrary, a fewer number or a greater number of areas may be employed without departing from the scope of the invention. The invention, therefore, is intended to encompass a structure that includes at least one area. The discussion of the first, second, third, and fourth areas 212, 214, 216, 218 is merely provided to discuss the details of the preferred embodiment of the second end cap 86.

After the securement washer 88 is positioned with the securement washer receiving well 210, the cylindrical wall 228 at the top of the securement washer receiving well 210 is machined (see FIG. 1) to secure the securement washer 88 within the second end cap 86. As with the first end cap 84, the end of the cylindrical wall 288 is folded over, via a suitable machining process, to capture the securement washer 88 in the second end cap 86.

As with the first end cap 84, it is contemplated that a reverse orientation may be employed to secure the securement washer 88 in the second end cap 86. Specifically, rather than providing the wall 228 at the top of the second end cap 86, a wall may be provided at the bottom of the second end cap 86. In this reverse orientation, the securement washer 88 would be inserted through the bottom of the second end cap 86 and a wall at the bottom would be folded over the securement washer 88. Both orientations are intended to be encompassed by the invention.

As illustrated in FIGS. 13 and 14, the fourth area 218 of the securement washer receiving well 210 is a tapered frusto-conically shaped chamber that accommodates the tapered end 94 of the bolt 82 once inserted through the securement washer 88. The tapered surface preferably is angled at 5°, as shown in FIG. 14. As would be appreciated by those skilled in the art, the angle may be greater or less than 5°.

Returning to FIG. 13, the top ends of the recesses 200 include a surface that is disposed at an angle 222 of about 60°. The angle 222 may be greater or less than 60° as required or desired by the manufacturer of the second end cap 86. As illustrated in FIG. 14, a fifth area 224 of the securement washer receiving well 210 has a wall disposed at an angle 226 preferably of about 15°. This angle 226 may be greater or less than 15° as required or desired by the manufacturer of the second end cap 86.

Figure 15:
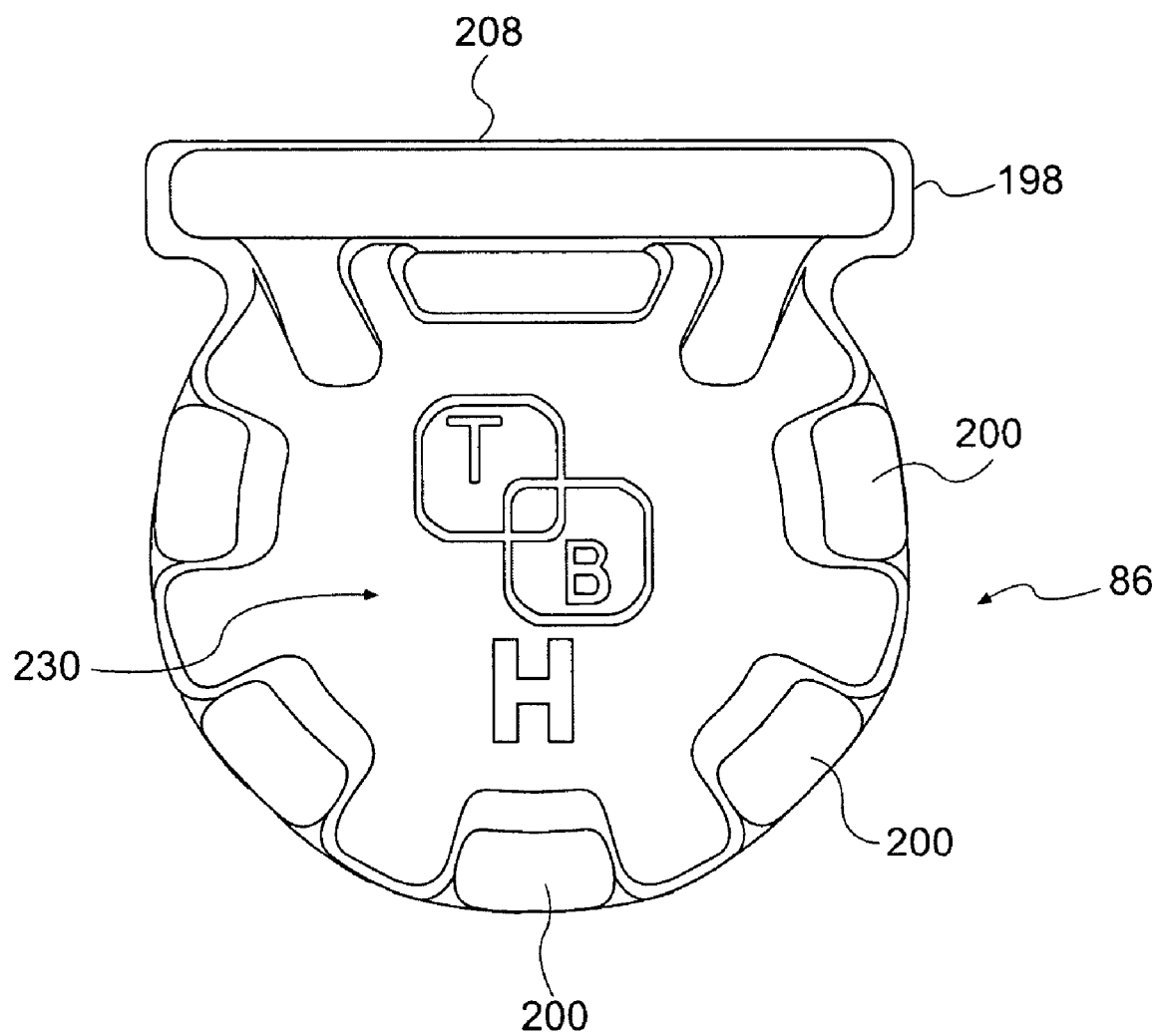
FIG. 15 is a bottom view of the second end cap illustrated in FIG. 11.
Figure 16:
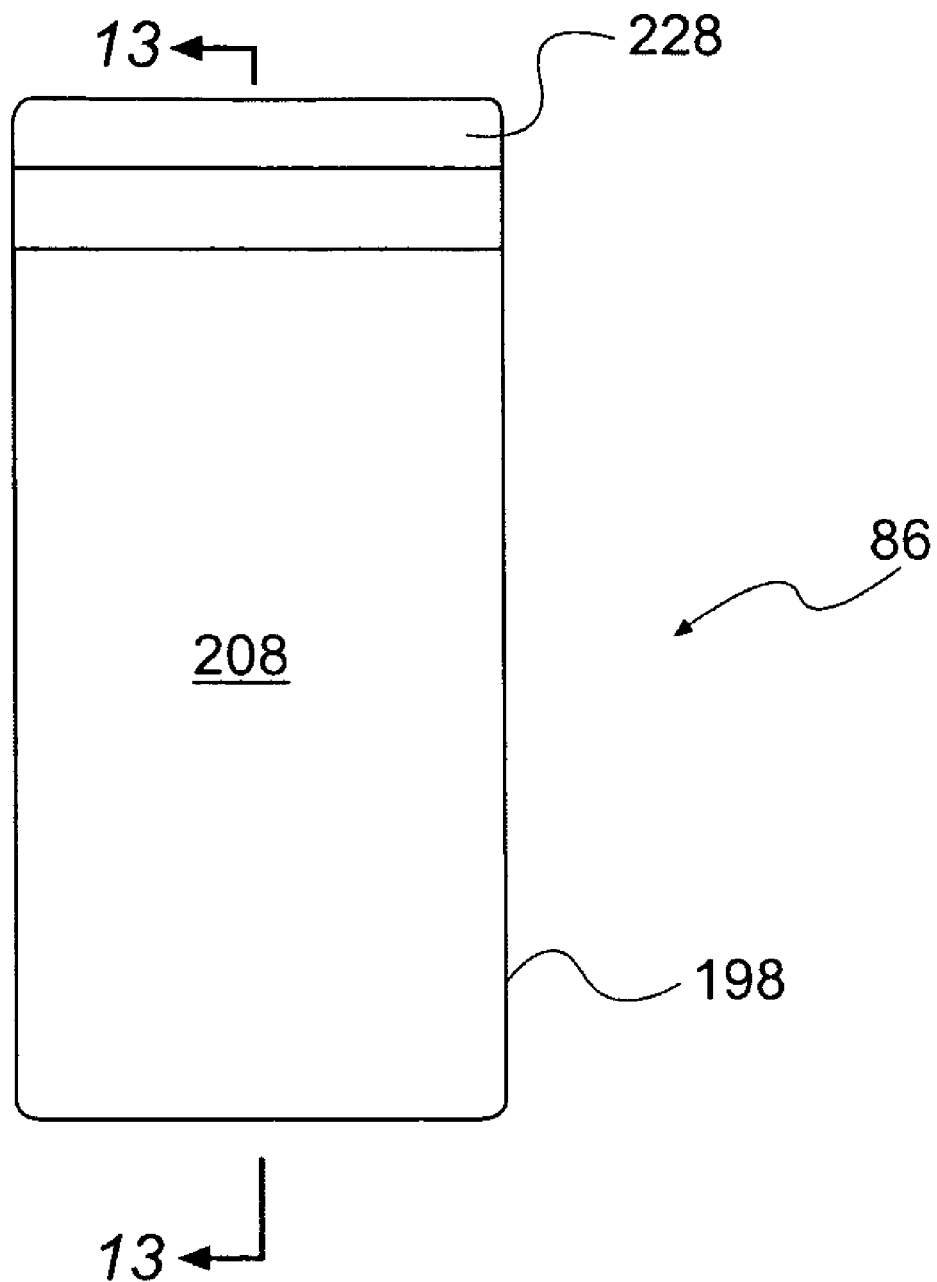
FIG. 16 is an exterior view of a label surface provided on the second end cap illustrated in FIG. 11.

FIG. 15 provides a bottom plan view of the second end cap 86 of the invention. The recesses 200 are clearly visible in this view. The bottom end of the second end cap 86 may be provided with identifying information 230 about the bolt seal 80.

The invention is not intended to encompass only a security seal 80 that includes both the first end cap 84 and the second end cap 86. It is contemplated that one of the first end cap 84 or the second end cap 86 may be excluded from the security seal. The invention is intended to encompass a construction where only one of the first end cap 84 or the second end cap 86 is employed.

Figure 17:
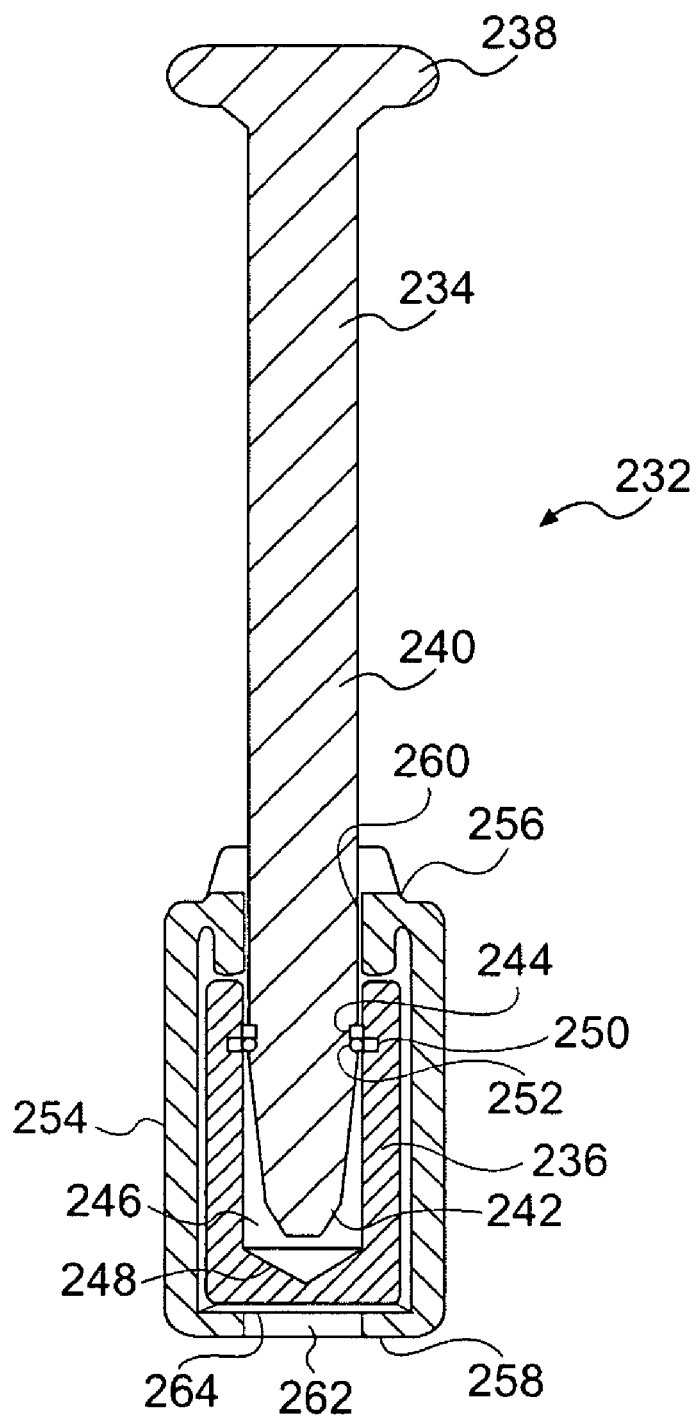
FIG. 17 is a cross-sectional side view of a second embodiment of a bolt seal according to the present invention.
Figure 18:
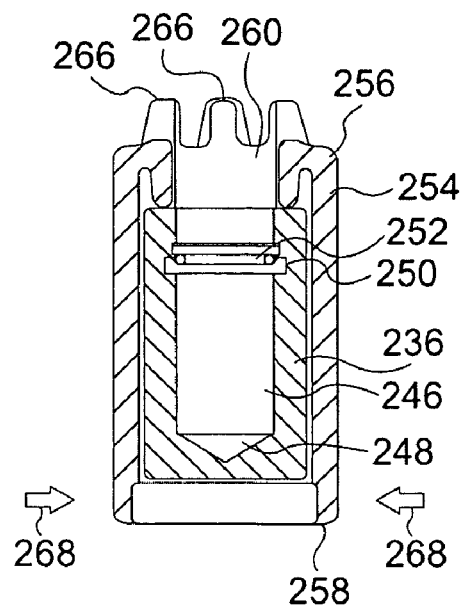
FIG. 18 is a cross-sectional side view of the nut of the bolt seal illustrated in FIG. 17, before the nut is sealed into its associated housing.
Figure 19:
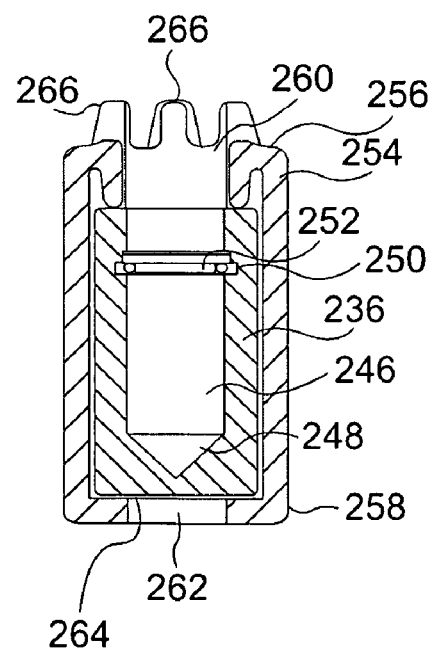
FIG. 19 is a cross-sectional side view of the nut shown in FIG. 18, after the nut is sealed into its associated housing.
Figure 20:
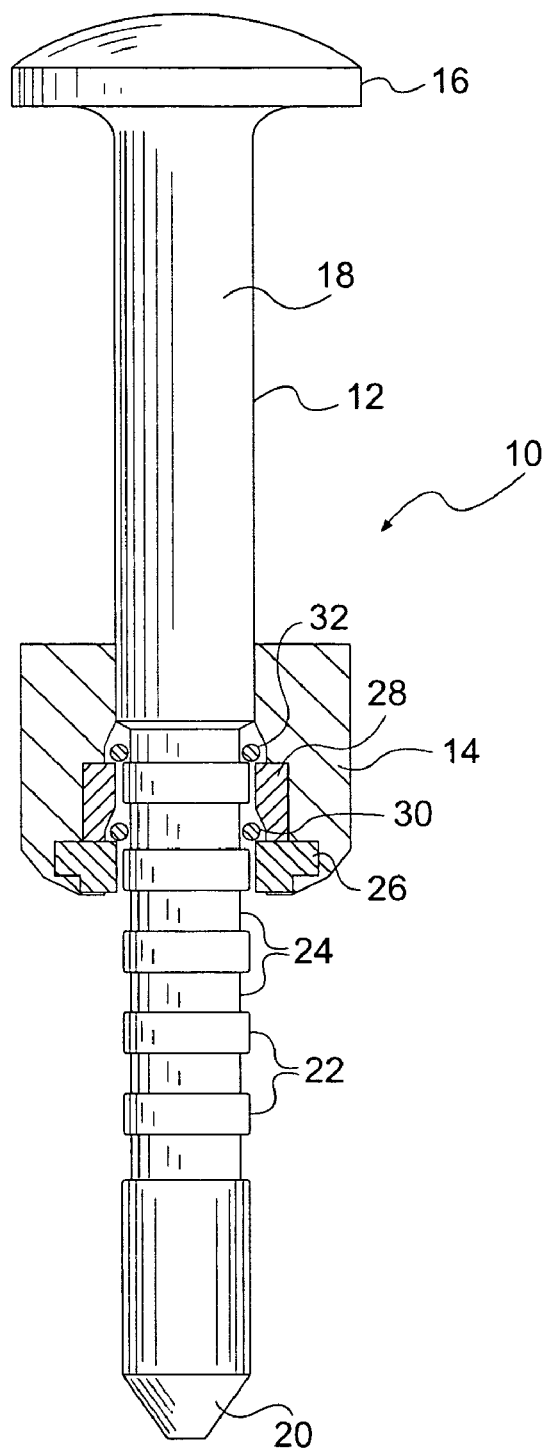
FIG. 20 is a cross-sectional side view of a bolt seal known in the prior art.
Figure 21:
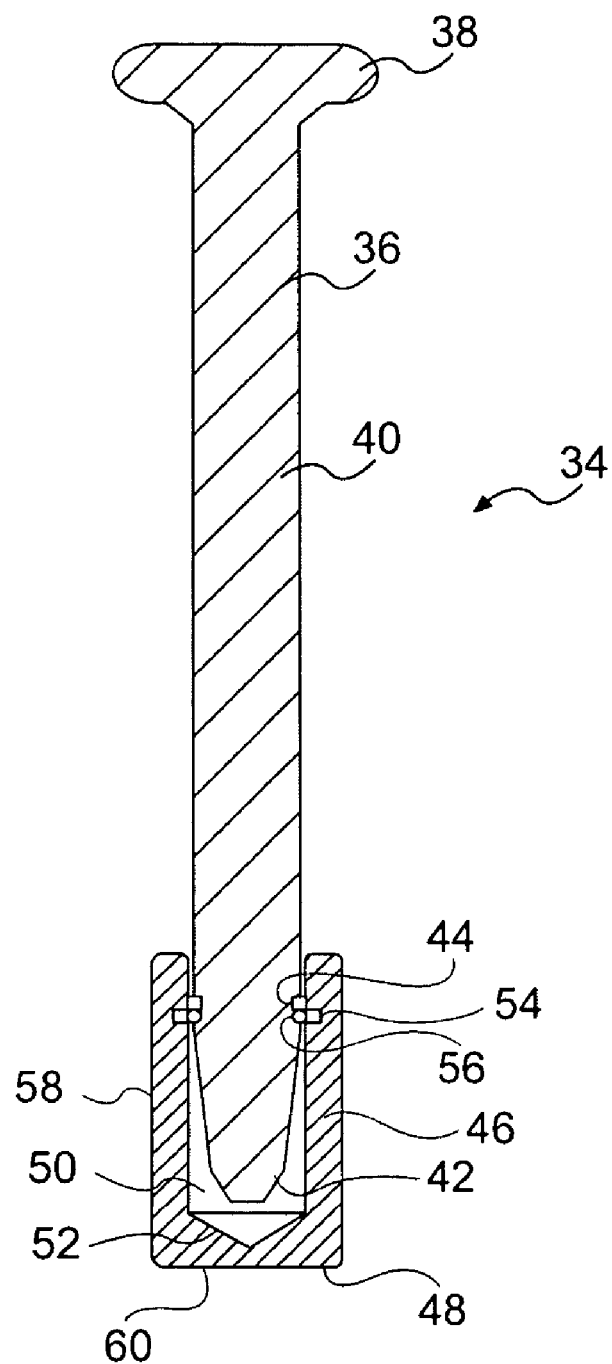
FIG. 21 is a cross-sectional side view of another bolt seal known in the prior art.

FIG. 17 is a cross-sectional side view of a second embodiment of a bolt seal 232 according to the present invention.

In this embodiment, the bolt seal 232 includes a bolt 234 and a nut 236. The bolt 234 includes a head 238 and a shaft 240 with a tapered end 242. Near the tapered end 242 of the shaft 240, a groove 244 is provided therein. The nut 236 essentially is a cylindrically-shaped body with a central bore 246 having a contoured bottom end 248. A groove 250 is defined by the bore 246 and contains a C-shaped ring 252. When the tapered end 242 of the bolt 234 is inserted into the central bore 246 of the nut 236 so that the grooves 244, 250 align, the C-shaped ring 252 will be captured by the grooves 144, 250 so that the nut 236 may not be removed easily from the bolt 234.

The nut 236 is provided with a housing 254. In the illustrated embodiment, the housing 254 is a cylindrically-shaped body with a top end 256 and a bottom end 258. The top end has a bore 260 therethrough, permitting the shaft 240 of the bolt 234 to pass therethrough into the central bore 246 of the nut 236. The housing 254 includes one or more protrusions 266 extending from the top end 256 thereof. In its assembled state, as shown in FIG. 17, the bottom end 258 of the housing defines an opening 262 therethrough, which exposes a bottom surface 264 of the nut 236.

In the preferred embodiment, as with the first embodiment of the invention, the housing 254 is constructed from plastic or other suitable material that is imbedded with or is otherwise provided with indicia of color. A colored plastic is preferred, but other materials may be employed without departing from the scope of the invention, as would be appreciated by those skilled in the art.

A method of manufacture of the bolt seal 80 will now be provided. As discussed in greater detail, the method of manufacture offers considerable advantages to the manufacture of bolt seals, such as the bolt seal 80 of the invention.

Figure 22:
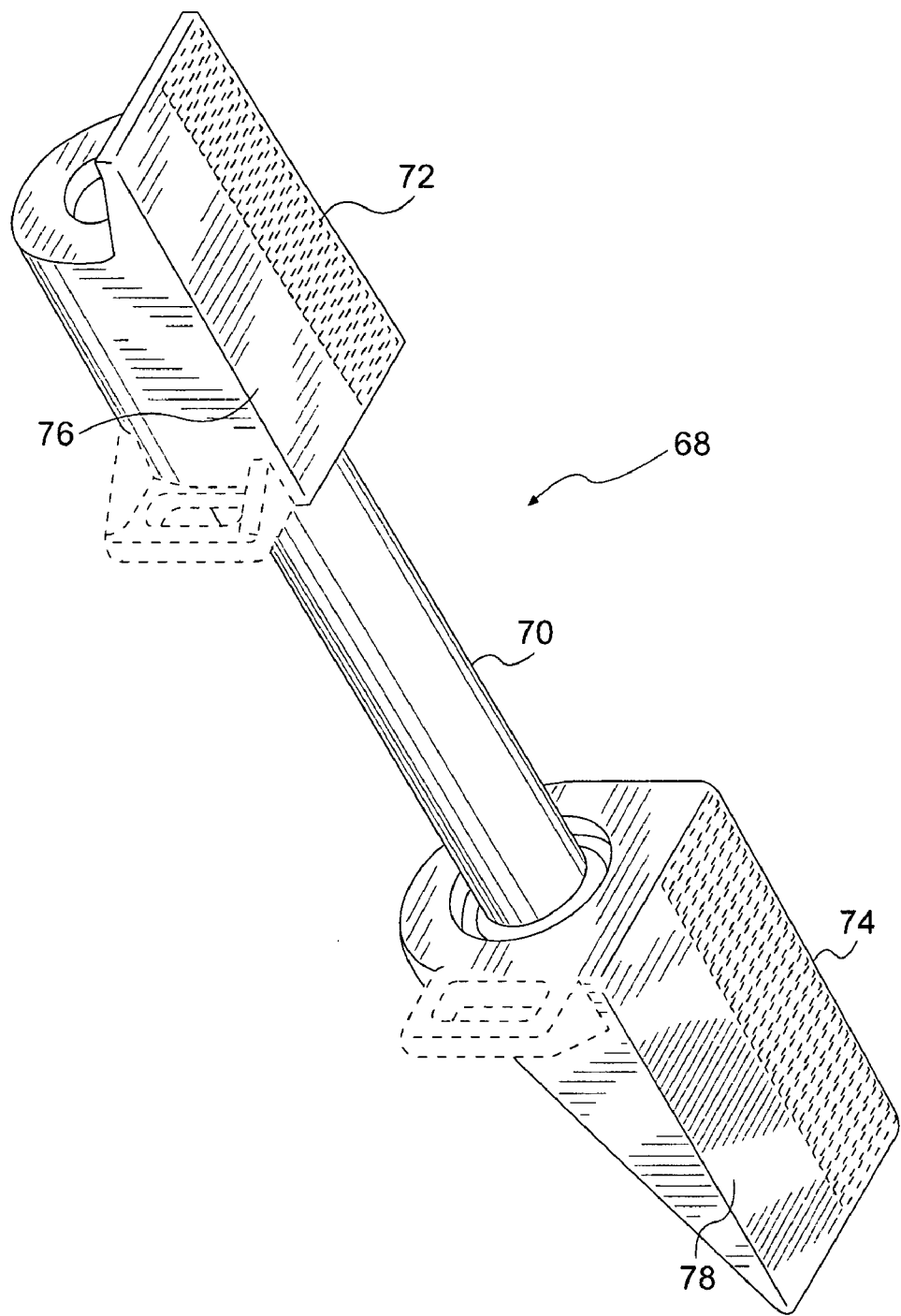
FIG. 22 is a perspective illustration of a top portion of a third embodiment of a bolt seal known in the prior art.
Figure 23:
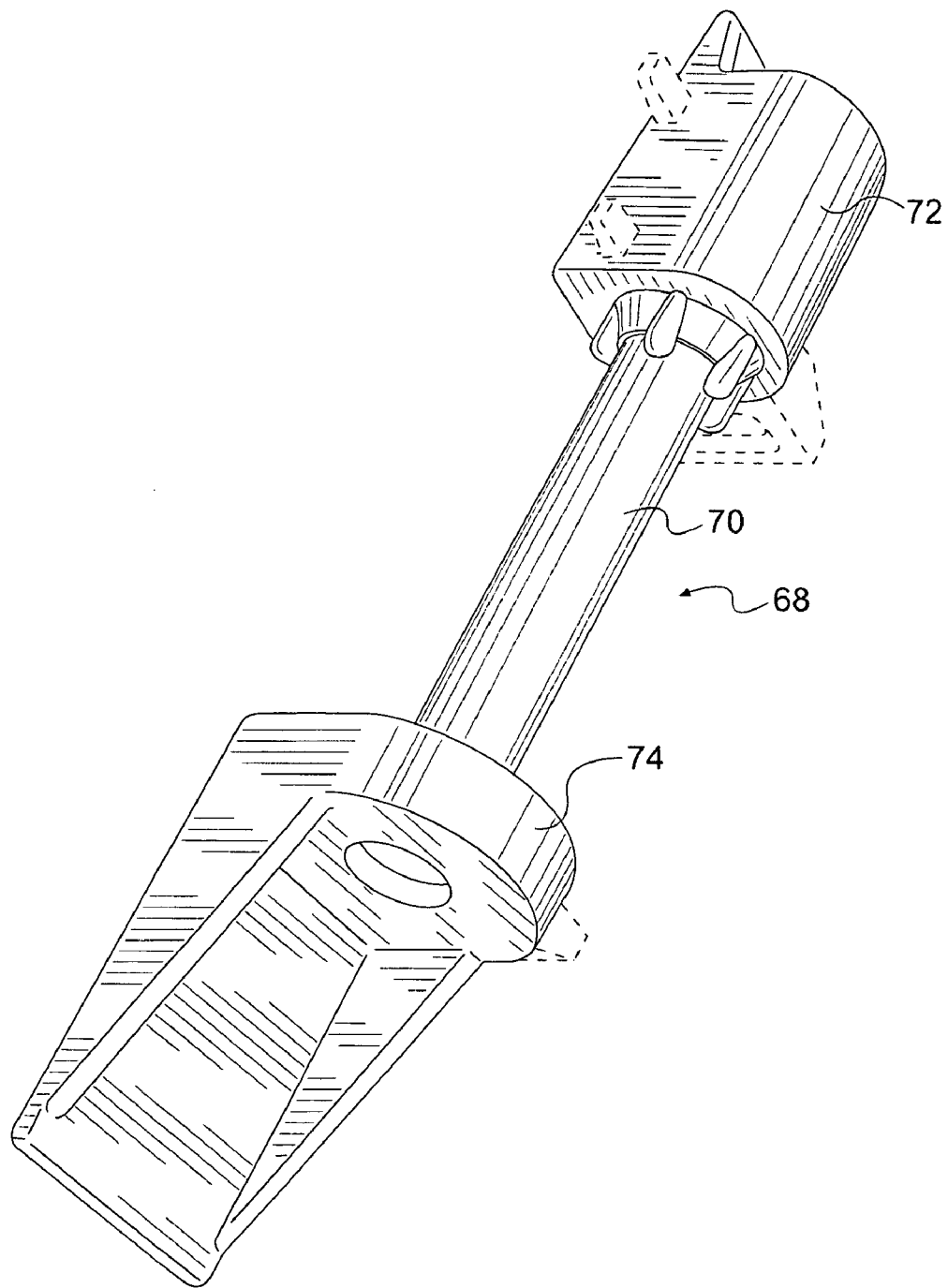
FIG. 23 is a perspective bottom view of the bolt seal illustrated in FIG. 22.

In the prior art, as discussed above in connection with FIGS. 22-23 (and U.S. Design Pat. No. Des. 514,425), it is known to mold plastic end caps around the head of the bolt and around the securement device that is affixed to the end of the bolt. As noted, in this construction, the securement device is a closed-ended metal nut (e.g., nut 46). As also noted, this construction present two challenges to a manufacturer of bolt seals. First, for securement purposes, it is not necessary to employ a securement device that is a closed structure made completely of metal, as in the case of the nut 46. The reasons for this are many-fold. Cost is one factor. If the securement device is completely as a closed metal structure, the cost of manufacturing the securement device is increased. Second, when the end caps, such as the end caps 72, 74 are injection molded around the head of the bolt and the closed metal securement device, a warehousing problem is created that adds to the cost of the bolt seal 68, as discussed above.

The inventors of the present invention recognized that it would be eminently more practical if the end caps 84, 86 could be manufactured separately from the bolt 82 and the securement washer 88 and attached to the bolt 82 and securement washer 88 before being sold to a shipper. In this way, the manufacturer of the bolt seal 80 need keep on hand only an assortment of different colored end caps 84, 86 and a reasonable supply of bolts 82 and securement washers 88.

The inventors of the present invention also recognized that the securement washer 88 could be altered from the securement device known in the prior art. Specifically, the securement washer 88 could be made to be considerably smaller in size and weight than the securement device known in the art. This assists in reducing the cost associated with the manufacture of the security bolt 80.

As the foregoing makes clear, however, the present invention is intended to encompass security seals that incorporate either the securement washer 88 or the nut 236.

To manufacture the security bolt 80, the bolt 82 is first inserted through the hole 152 in the first end cap 84. Once fully inserted, the head 90 of the bolt will abut the bottom surface of the bolt head receiving well 150. In this stage, the cylindrical wall 172 extends above the top surface of the head 90 of the bolt 82.

To secure the bolt 82 in the first end cap 84, the wall 172 is folded over the end of the head 90 of the bolt 82 as illustrated in FIG. 1. The wall 172 may be folded over the head 90 of the bolt 82 using any of a number of different folding methodologies and techniques. Preferably, the wall 172 is folded over the head 90 using an orbital riveting or orbital peening technique.

Orbital riveting refers to a manufacturing technique that is typically utilized to rivet two metal components together. U.S. Pat. Nos. 5,855,054 and 6,161,273 are representative of this orbital riveting technique and are incorporated herein by reference. Orbital peening refers to the same manufacturing technique as it applies to materials other than metals.

In the orbital peening process, pressure is applied by a rotating head to the walls 172, 228, 258. As the head rotates around the walls 172, 228, 258, the head applies pressure to press the walls 172, 228, 258 inwardly, thereby securing the bolt 82, the securement washer 88, or the nut 236 in the first end cap 84, the second end cap 86, or the housing 254.

As would be appreciated by those skilled in the art, other techniques may be used to secure the bolts 82, the securement washers 88, and the nuts 236 in the first and second end caps 84, 86 or the housing 254. For example, a heating technique may be used. Alternatively, a plastic cap could be adhered or sonically welded in place. Other techniques, as would be known to those skilled in the art, also may be employed without departing from the present invention.

As noted, the orbital peening technique is preferred because it doe not require adhesives, the application of heat, or the need for additional plastic components (e.g., caps) to manufacture the security bolt 80, 232.

It is also noted, for purposes of reference that the securement washer 88 and the securement nut 236 are generally referred to as securement devices. In other words, the term "securement device" is intended to encompass the securement washer 88, the securement nut 236, and any equivalents thereof, all of which are intentionally encompassed by the invention.

As would be appreciated by those skilled in the art, there are many alternative ways in which to practice the present invention, as would be understood by those skilled in the art. The embodiments described herein are merely representative of the broad scope of the invention.

What is claimed is:

1. A method of manufacturing a security device, comprising:
   providing a bolt comprising a shaft portion and a head portion;
   providing a first end cap with a bolt head receiving well;
   inserting the head portion of the bolt into the bolt head receiving well until the head portion of the bolt is seated in the bolt head receiving well;
   closing the first end cap around the head portion of the bolt by folding a circumferential wall of the first end cap around the head portion of the bolt via an orbital peening process; and
   providing a second end cap with a securement device for receiving a shaft end of the shaft portion of the bolt therein to secure the second end cap at the shaft end of the bolt opposite from the head portion of the bolt.

2. The method of claim 1, further comprising:
   providing a first end cap label platform on the first end cap; and
   applying label information to the first end cap label platform.

3. The method of claim 2, wherein label information is applied to the first end cap label platform by an inscribing process.

4. The method of claim 3, wherein the inscribing process is a laser inscribing process.

5. The method of claim 1, wherein the first end cap comprises plastic.

6. The method of claim 1, wherein providing a second end cap comprises providing a second end cap with a securement device having a hole with a diameter permitting the shaft end of the shaft portion of the bolt to be disposed therein.

7. The method of claim 6, wherein providing a bolt comprises providing a bolt having a shaft portion with a first circumferential groove therein, and wherein providing a second end cap comprises providing a second end cap having a second circumferential groove within the hole.

8. The method of claim 7, further comprising providing a C-shaped ring at the second circumferential groove, wherein the C-shaped ring is configured to be received at least partially in the first circumferential groove when the shaft end of the shaft portion of the bolt is received in the hole to secure the second end cap at the shaft end of the bolt opposite from the head portion of the bolt.

9. A method of manufacturing a security device, comprising:
providing a first end cap with a bolt head receiving well and a first end cap hole;
inserting a bolt with a head though the first end cap hole until the head of the bolt is seated in the bolt receiving well;
providing a second end cap with a securement washer receiving well;
inserting a securement washer into the securement washer receiving well;
closing the first end cap around the head of the bolt, thereby securing the bolt within the first end cap; and
closing the second end cap around the securement washer, thereby securing the securement washer within the second end cap.

10. The method of claim 9, wherein an orbital peening process closes the first end cap around the head of the bolt by folding a first end cap circumferential wall over the head of the bolt.

11. The method of claim 9, wherein an orbital peening process closes the second end cap around the securement washer by folding a second end cap circumferential wall over the securement washer.

12. The method of claim 9, further comprising:
providing a tapered end on the securement washer; and
providing a tapered surface in the securement washer receiving well that compliments the tapered end of the securement washer,
wherein the securement washer is inserted into the securement washer receiving well such that the tapered end of the securement washer abuts the tapered surface in the securement washer receiving well.

13. The method of claim 9, further comprising:
providing a first end cap label platform on the first end cap; and
applying label information to the first end cap label platform.

14. The method of claim 13, wherein label information is applied to the first end cap label platform by an inscribing process.

15. The method of claim 14, wherein the inscribing process is a laser inscribing process.

16. The method of claim 9, further comprising:
providing a second end cap label platform on the second end cap; and
applying label information to the second end cap label platform.

17. The method of claim 16, wherein label information is applied to the second end cap label platform by an inscribing process.

18. The method of claim 17, wherein the inscribing process is a laser inscribing process.

19. A method of manufacturing a security device, comprising:
providing a bolt comprising a shaft portion and a head portion;
providing an end cap with a securement device receiving well;
providing a securement device having a hole with a diameter permitting the shaft end of the shaft portion of the bolt to be disposed therein;
inserting said securement device into the securement device receiving well until the securement device is seated in the securement device receiving well; and
closing the end cap around the securement device by folding a circumferential wall of the end cap around the securement device via an orbital peening process, wherein the securement device receiving well is configured to receive a shaft end of the shaft portion of the bolt therein to secure the end cap to the bolt at the shaft end of the bolt opposite the head portion of the bolt.

20. The method of claim 19, wherein providing a bolt comprises providing a bolt having a shaft portion with a first circumferential groove therein, and wherein providing an end cap comprises providing an end cap having a second circumferential groove within the hole.

21. The method of claim 20, further comprising providing a C-shaped ring at the second circumferential groove, wherein the C-shaped ring is configured to be received at least partially in the first circumferential groove of the bolt when the shaft end of the shaft portion of the bolt is received in the hole to secure the end cap at the shaft end of the bolt opposite from the head portion of the bolt.

22. The method of claim 19, further comprising:
providing an end cap label platform on the end cap; and
applying label information to the end cap label platform.

23. The method of claim 22, wherein label information is applied to the end cap label platform by an inscribing process.

24. The method of claim 23, wherein the inscribing process is a laser inscribing process.

25. The method of claim 19, wherein the end cap comprises plastic.

* * * * *